(12) United States Patent
Gray et al.

(10) Patent No.: US 10,594,790 B2
(45) Date of Patent: Mar. 17, 2020

(54) DATA COMPRESSION IN A DISPERSED STORAGE NETWORK

(71) Applicant: International Business Machines Corporation, Armonk, NY (US)

(72) Inventors: Adam M. Gray, Chicago, IL (US); Ravi V. Khadiwala, Bartlett, IL (US); Greg R. Dhuse, Chicago, IL (US); Jason K. Resch, Chicago, IL (US); Praveen Viraraghavan, Chicago, IL (US); Russell C. Fordyce, Rockford, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 15/636,094

(22) Filed: Jun. 28, 2017

(65) Prior Publication Data
US 2019/0007493 A1 Jan. 3, 2019

(51) Int. Cl.
*H04L 29/08* (2006.01)
*G06F 3/06* (2006.01)
*H04L 29/06* (2006.01)

(52) U.S. Cl.
CPC .......... *H04L 67/1097* (2013.01); *G06F 3/067* (2013.01); *G06F 3/0608* (2013.01); *G06F 3/0611* (2013.01); *G06F 3/0638* (2013.01); *H04L 67/04* (2013.01); *H04L 67/10* (2013.01); *H04L 69/04* (2013.01)

(58) Field of Classification Search
USPC ....................................................... 709/247
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Shamir; How to Share a Secret; Communications of the ACM; vol. 22, No. 11; Nov. 1979; pp. 612-613.

(Continued)

*Primary Examiner* — David R Lazaro
*Assistant Examiner* — Berhanu Shitayewoldetadik
(74) *Attorney, Agent, or Firm* — Garlick & Markison; Timothy W. Markison; Bruce E. Stuckman

(57) ABSTRACT

A method for execution by a dispersed storage and task (DST) processing unit includes receiving a write request that includes a data object. Characterization data is generated by determining a data type of the data object. Object constraint data is generated by determining a compressibility of the data type and a processing cost of the data type. Optimized trade-off data is generated by optimizing a plurality of trade-off constraints based on the object constraint data. A compression algorithm is selected from a plurality of compression algorithm options based on the optimized trade-off data. A compressed data object is generated by performing the selected compression algorithm on the data object. A plurality of data slices are generated for transmission to a plurality of storage units for storage by performing an information dispersal algorithm on the compressed data object.

20 Claims, 6 Drawing Sheets

(56) References Cited

U.S. PATENT DOCUMENTS

| | | | |
|---|---|---|---|
| 5,774,643 A | 6/1998 | Lubbers et al. | |
| 5,802,364 A | 9/1998 | Senator et al. | |
| 5,809,285 A | 9/1998 | Hilland | |
| 5,812,819 A * | 9/1998 | Rodwin | H04L 29/12311 703/23 |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 * | 3/2002 | Katsandres | G06F 9/547 709/203 |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 * | 5/2003 | Bowman-Amuah | H04L 67/303 709/219 |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,069,544 B1 * | 6/2006 | Thekkath | G06F 11/364 714/E11.207 |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,472,334 B1 | 12/2008 | Scott et al. | |
| 7,574,570 B2 | 8/2009 | Gladwin et al. | |
| 7,574,579 B2 | 8/2009 | Gladwin et al. | |
| 7,636,724 B2 | 12/2009 | de la Torre et al. | |
| 7,877,511 B1 * | 1/2011 | Berger | H04L 67/16 709/242 |
| 7,895,242 B2 | 2/2011 | Ergan | |
| 7,979,394 B2 * | 7/2011 | Morris | H03M 7/30 707/640 |
| 8,019,960 B2 | 9/2011 | Gladwin et al. | |
| 8,171,101 B2 | 5/2012 | Gladwin et al. | |
| 8,261,033 B1 | 9/2012 | Slik et al. | |
| 8,458,424 B2 | 6/2013 | Sudo et al. | |
| 8,819,452 B2 * | 8/2014 | Gladwin | G06F 21/602 713/193 |
| 9,264,397 B2 * | 2/2016 | Meyer | H04L 9/00 |
| 9,594,639 B2 * | 3/2017 | Khadiwala | G06F 11/1435 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0065656 A1 | 4/2003 | de la Torre et al. | |
| 2003/0084020 A1 | 5/2003 | Shu | |
| 2004/0024963 A1 | 2/2004 | Talagala et al. | |
| 2004/0086117 A1 | 5/2004 | Petersen et al. | |
| 2004/0122917 A1 | 6/2004 | Menon et al. | |
| 2004/0133577 A1 * | 7/2004 | Miloushev | G06F 11/1076 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0067343 A1 * | 3/2006 | Tagawa | H04L 41/22 370/401 |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0034417 A1 * | 2/2008 | He | H04L 67/02 726/15 |
| 2008/0126357 A1 | 5/2008 | Casanova et al. | |
| 2009/0094251 A1 | 4/2009 | Gladwin et al. | |
| 2009/0094318 A1 | 4/2009 | Gladwin et al. | |
| 2009/0319534 A1 * | 12/2009 | Gokhale | G06F 16/1748 |
| 2010/0023524 A1 | 1/2010 | Gladwin et al. | |
| 2010/0023529 A1 | 1/2010 | Gladwin et al. | |
| 2010/0115061 A1 | 5/2010 | Tai et al. | |
| 2010/0115063 A1 | 5/2010 | Gladwin et al. | |
| 2010/0269048 A1 * | 10/2010 | Pahlavan | H04L 63/08 715/740 |
| 2011/0016091 A1 * | 1/2011 | Prahlad | G06F 11/1453 707/654 |
| 2011/0025925 A1 * | 2/2011 | Hansen | G06F 3/0325 348/734 |
| 2011/0029524 A1 * | 2/2011 | Baptist | G06F 11/1076 707/737 |
| 2011/0047594 A1 * | 2/2011 | Mahaffey | G06F 21/564 726/1 |
| 2011/0107165 A1 * | 5/2011 | Resch | G06F 11/07 714/746 |
| 2012/0158196 A1 | 6/2012 | Eldershaw et al. | |
| 2012/0203916 A1 * | 8/2012 | Burns | H04L 29/1249 709/227 |
| 2012/0311395 A1 | 12/2012 | Leggette | |
| 2013/0275776 A1 * | 10/2013 | Baptist | H04L 67/1097 713/193 |
| 2014/0203922 A1 * | 7/2014 | Marshall | G08C 17/02 340/12.5 |
| 2014/0281817 A1 * | 9/2014 | Grube | G06F 11/1076 714/769 |
| 2016/0224423 A1 * | 8/2016 | Grube | G06F 11/10 |
| 2018/0307441 A1 * | 10/2018 | Auvenshine | G06F 3/0608 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interlace (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

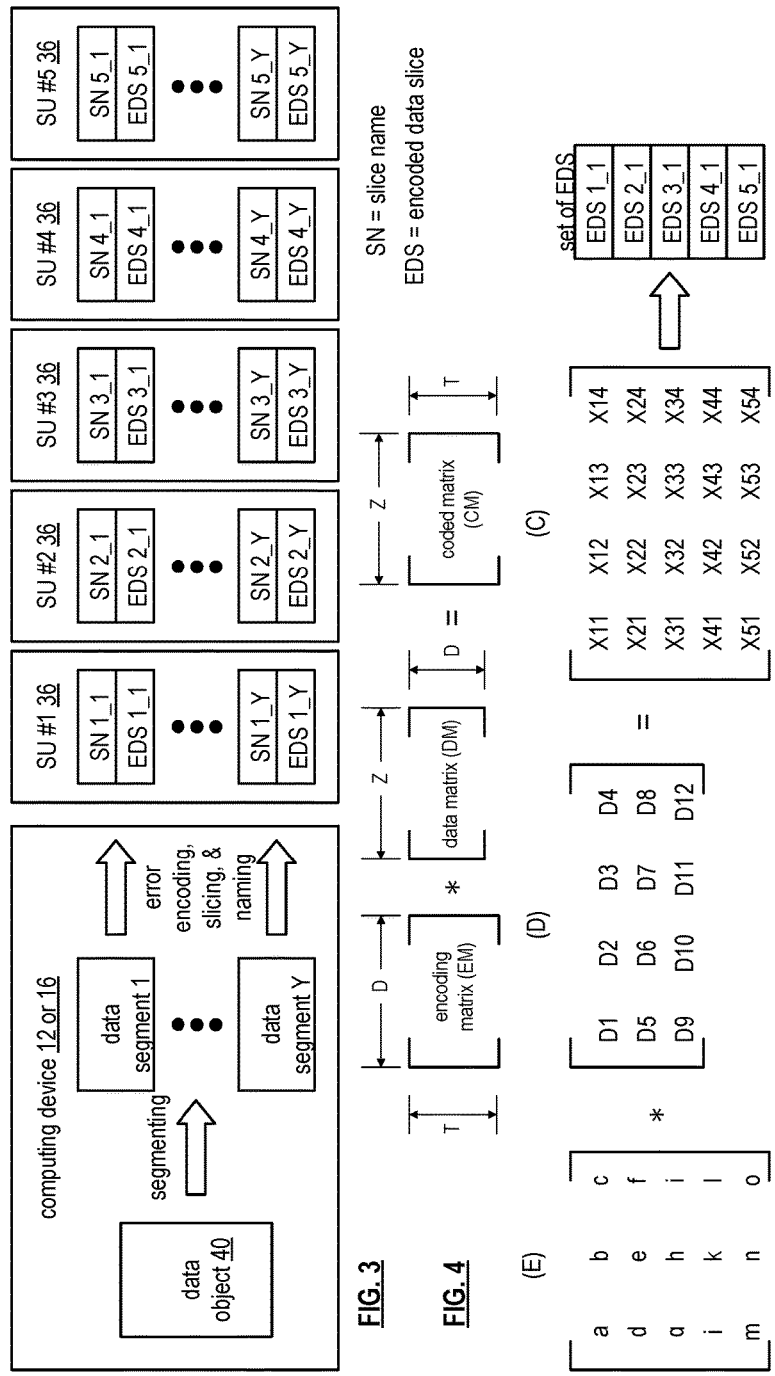

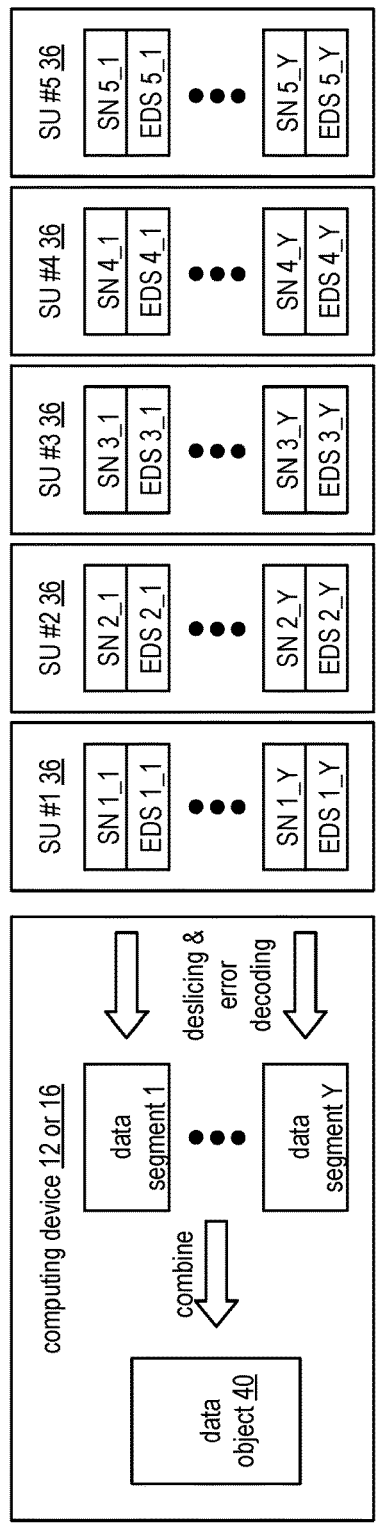

DATA COMPRESSION IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
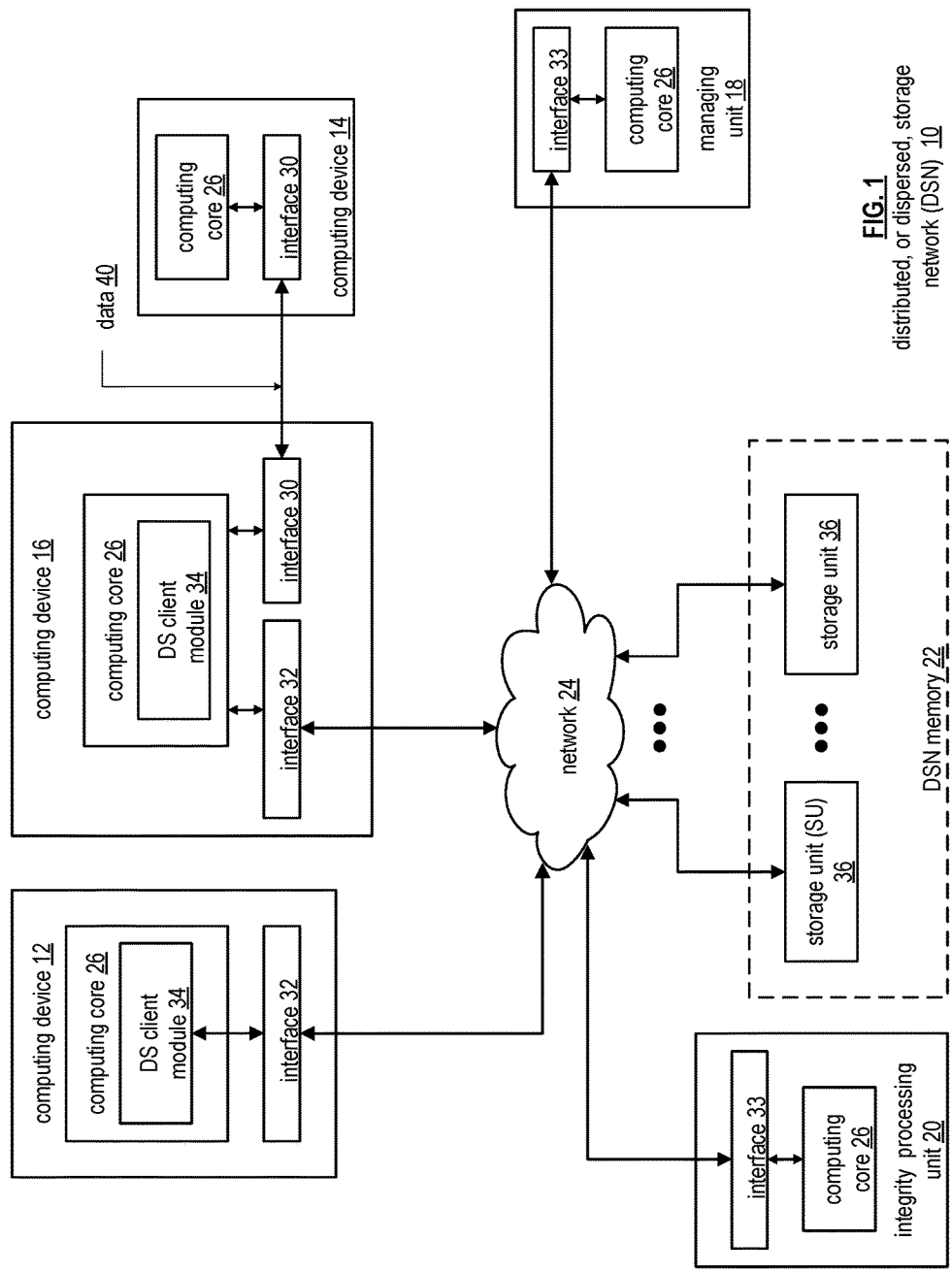
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
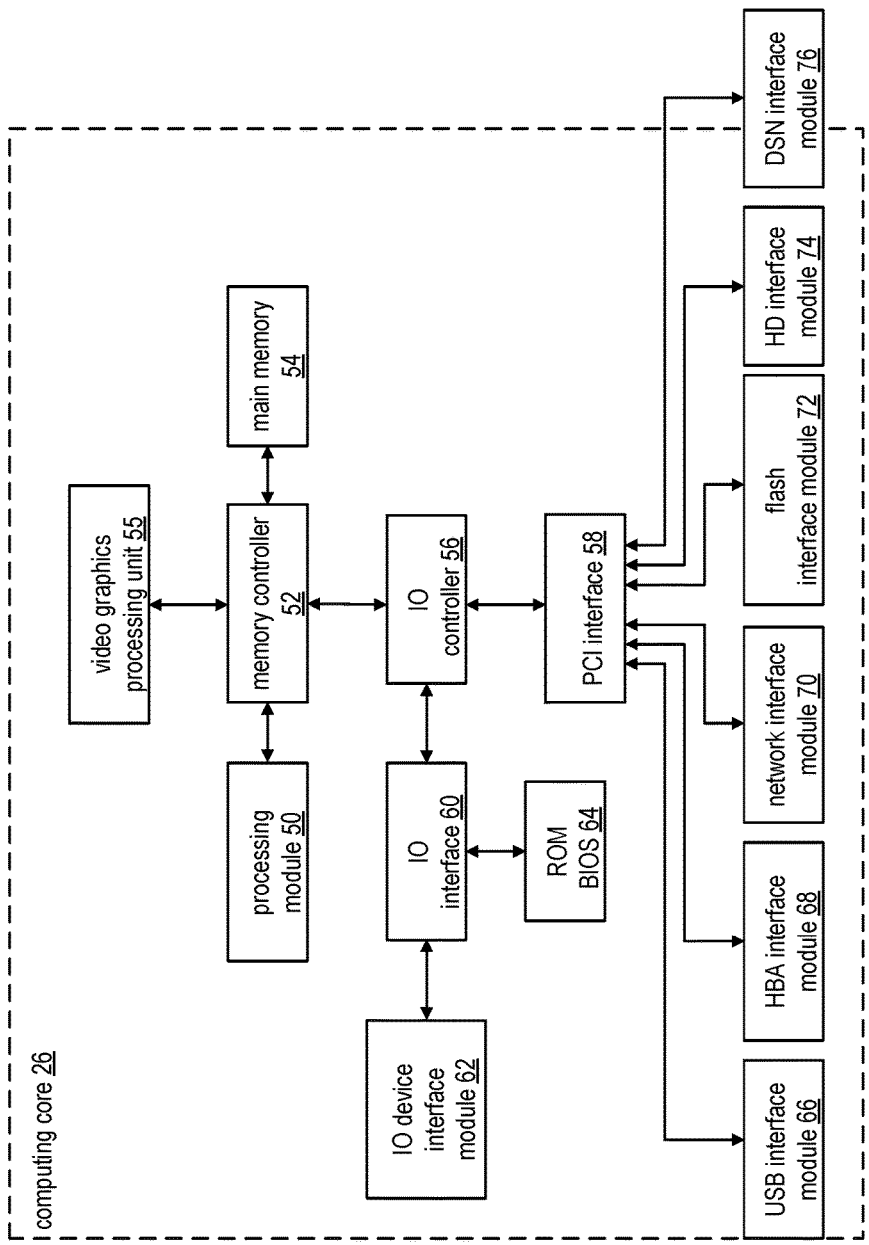
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS _1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
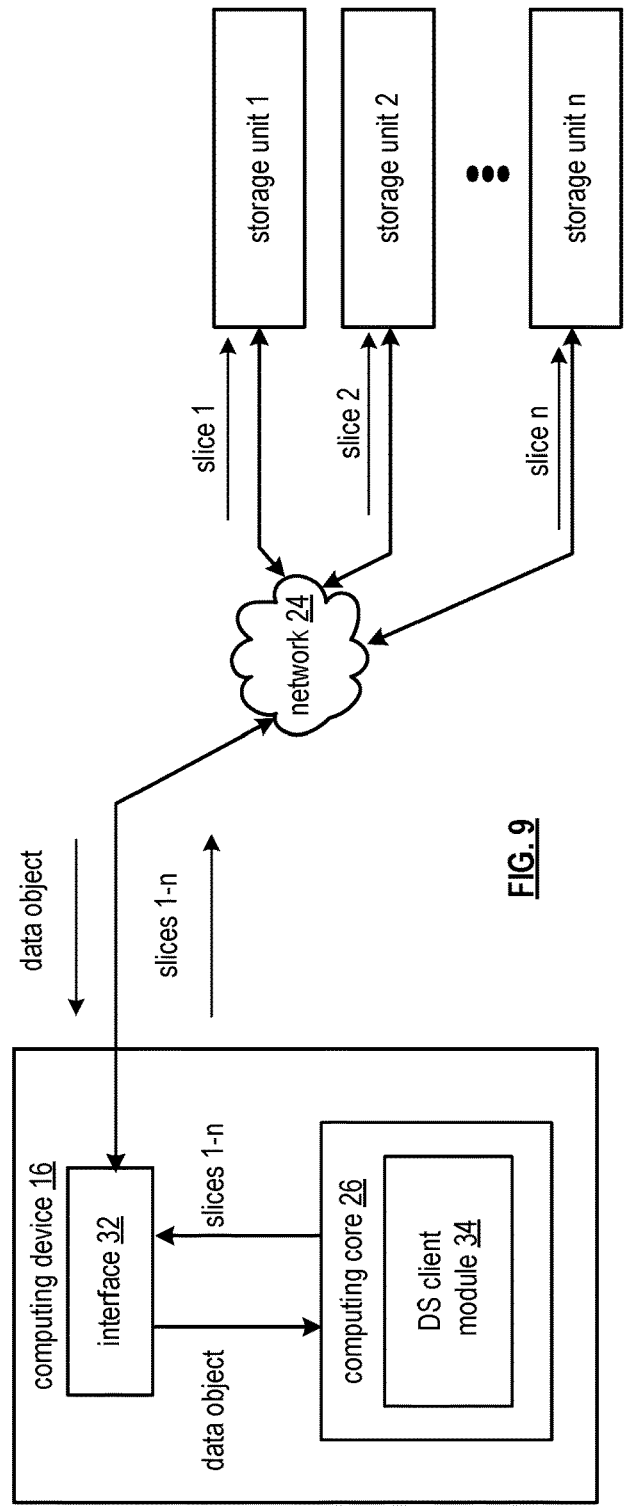
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a computing device 16 of FIG. 1, the network 24 of FIG. 1, and a plurality of storage units 1-n. The computing device 16 can include the interface 32 of FIG. 1, the computing core 26 of FIG. 1, and the DS client module 34 of FIG. 1. The computing device 16 can function as a dispersed storage processing agent for computing device 14 as described previously, and may hereafter be interchangeably referred to as a distributed storage and task (DST) processing unit. Each storage unit may be implemented utilizing the storage unit 36 of FIG. 1. The DSN functions to compress and store data objects, where a data object is compressed before generating slices 1-n for storage, and slices 1-n correspond to slices of a compressed data object.

Compression algorithms represent a compromise between these two finite resources: processing and storage. The number of bits ultimately stored can vary based on the compressibility of the data, the compression algorithm employed, and the amount of processing time utilized by the compression algorithm. Different compression algorithms have different trade-offs between compression ratios and processing throughput.

A dynamic application of these algorithms by the DST processing unit can be tuned based on a data object's name, extension, content, magic numbers, and/or a compression sampling. Based on these factors, the optimal compression algorithm can be determined and applied. In the case of optimizing access latency, some tradeoff must be determined between processing time and network transfer time that is saved by a given compression ratio. The DST processing unit may then opt to apply a different compression algorithm, or none at all, to minimize the storage-compress or retrieve-decompress times. The DST processing unit can select a compression algorithm by making a "compression determination".

The DST processing can first receive a data object or other data to be stored from a requesting entity. The DST processing unit can analyze the received data and can characterize the data type. For example, the DST processing unit can generate characterization data for the data object to determine the data type. This can include determining, and/or can be based on at least one of, a mime type of the data; object name of the data; an extension, the requesters historical usage patterns; a magic value or other value within the data; an inspection or heuristic analysis of data content; and/or other attributes of the request, such as metadata in the request or a header in the request indicating a type.

The DST processing unit can then determine compressibility and/or processing costs for the data type determined in this characterization. This can include generating object constraint data, which can include compressibility data and/or processing cost data, determined, for example, by calculating a compressibility score and/or processing cost score. The compressibility and/or processing cost can be determined by performing a compression assessment using a live test with one or more different algorithms to achieve a sampling. Alternatively or in addition, the compressibility and/or processing cost can be determined based on historical results of previous examples for the determined data type under one or more different compression algorithms.

The DST processing unit can make a compression decision, for example based on the determined compressibility and/or processing cost. The compression decision can include determining whether or not to compress the data. If the DST processing unit determines to compress the data, the DST processing unit can further determine which compression algorithm to employ, for example, by selecting a compression algorithm from a fixed set of different compression algorithms and/or by selecting and/or calculating discrete and/or continuous parameter values for a compression algorithm. Determining which compression algorithm to employ can include optimizing trade-off constraints. For example, the at least one of the following factors can be utilized by the DST processing unit in determining which compression algorithm to employ: spare CPU resources of the DST processing units at the time; networking recourses of the DST processing unit; networking resources of one or more storage units, storage capacity of the system; compression rate of the compression algorithm; resources of the requesting entity or other entities that may read the data in the future; how frequently the data will be accessed; estimation of restoring the data by rebuilding; attributes of the decompression rate; and/or impact of network bandwidth and/or decompression processing time to object access latency. Optimizing the trade-off constraints can be based on the compressibility and/or the processing cost determined for the data type in the object constraint data. Alternatively or in addition, optimizing trade-off constraints can include calculating or otherwise determining some or all of these factors, for example, if they are fixed or deterministic factors. Alternatively or in addition, optimizing trade-off constraints can include determining a subset of these factors to be optimized. Alternatively or in addition, optimizing the trade-off constraints can include calculating a trade-off score for a set of different compression algorithms based on one or more of these factors, and selecting the compression algorithm that corresponds to the most favorable trade-off score. Alternatively or in addition, optimizing trade-off constraints can include performing an optimization algorithm to individually and/or jointly optimize one or more of these factors. Performing the optimization algorithm can include utilizing one or more calculated, fixed factors that are included in the set of factors to be optimized.

Once the DST processing unit has determined an optimal trade off and selected an optimal compression configuration and/or algorithm. it uses the selected optimal compression configuration and/or algorithm can be performed on the data object to compress the data object's content. This compression can be performed on the data object prior to processing with the information dispersal algorithm (IDA) to yield slices. Thus, after a compressed data object has been generated by performing the selected compression algorithm on the data object, the IDA can be performed on the compressed data object to generate the data slices for storage. In some embodiments, performing the selected compression algorithm can include compressing some or all data slices after performing the IDA, in addition to or instead of compressing the data before performing the IDA.

Algorithm indicator data that indicates of the selected compression algorithm and/or selected parameters of the compression algorithm used can be stored with the object. The algorithm indicator data can be included in the data object, for example, as a header field and/or as metadata, or otherwise can be stored and/or mapped to the data object, before performing the IDA. The algorithm indicator data can also be included in and/or otherwise mapped to each data segment and/or each data slice after the IDA is performed. A requesting entity reading the data can request the data object from the DST processing unit, and upon retrieving the data slices from memory and reconstructing the compressed data object, the DST processing unit can determine the compression algorithm used from the algorithm indicator data and select and perform the corresponding decompression algorithm accordingly to decompress and recover the original data, for example, if a lossless compression algorithm was selected and applied, or recover a lossy version of the original data, for example, if a lossy compression algorithm was selected and applied. The decompressed data object can be transmitted to the requesting entity. In other embodiments, the compressed data object can be transmitted to the requesting entity, and the requesting entity can decompress the data based on the algorithm indicator data.

In various embodiments, a processing system of a dispersed storage and task (DST) processing unit includes at least one processor and a memory that stores operational instructions, that when executed by the at least one processor cause the processing system to A method for execution by a dispersed storage and task (DST) processing unit includes receiving a write request that includes a data object. Characterization data is generated by determining a data type of the data object. Object constraint data is generated by determining a compressibility of the data type and a processing cost of the data type. Optimized trade-off data is generated by optimizing a plurality of trade-off constraints based on the object constraint data. A compression algorithm is selected from a plurality of compression algorithm options based on the optimized trade-off data. A compressed data object is generated by performing the selected compression algorithm on the data object. A plurality of data slices are generated for transmission to a plurality of storage units for storage by performing an information dispersal algorithm on the compressed data object.

In various embodiments, determining the data type of the data object is based on a mime type of the data object, a name of the data object, and/or an extension of the data object. In various embodiments, determining the data type of the data object is based on a heuristic analysis of content of the data object.

In various embodiments, generating the object constraint data includes performing a compression assessment using a live test, where the live test includes performing a plurality of different compression algorithms to generate a corresponding plurality of samples. The compressibility and the processing cost are determined based on the corresponding plurality of samples. In various embodiments, generating the object constraint data is based on historical results that include a plurality of previous samples for a plurality of data objects corresponding to the data type, where the plurality of previous samples were generated by performing a plurality of different compression algorithms on the plurality of data objects. The compressibility and the processing cost are determined based on the plurality of previous samples.

In various embodiments, compression decision data is generated to determine whether to compress the data object based on the object constraint data. The compression algorithm is selected when the compression decision data indicates that the data object be compressed. The plurality of data slices are generated by performing an information dispersal algorithm on the data object in an uncompressed format when the compression decision data indicates that the data object not be compressed.

In various embodiments, the plurality of trade-off constraints includes spare CPU resources of the DST processing unit, networking resources, storage capacity of the plurality of storage units, and/or compression rate of the compression algorithm. In various embodiments, generating the optimized trade-off data is further based on estimated access frequency of the data object and/or resources of entities expected to transmit read requests to read the data object. In various embodiments, generating the optimized trade-off data is further based on object access latency, where the object access latency is calculated based on networking bandwidth and/or processing time to decompress.

In various embodiments, the compressed data object includes algorithm indicator data. An access request is received via the network from a requesting entity, where the access request includes an identifier of the data object. A plurality of read requests are generated based on the identifier for transmission, via the network, to the plurality of storage units. The plurality of data slices are received via the network in response. A reconstructed compressed data object is generated based on the information dispersal algorithm. The algorithm indicator data is extracted from the reconstructed compressed data object. A decompression algorithm is selected from a plurality of decompression algorithm options based on the algorithm indicator data. A reconstructed data object is generated by performing the selected decompression algorithm. The reconstructed data object is transmitted to the requesting entity via the network.

Figure 10:
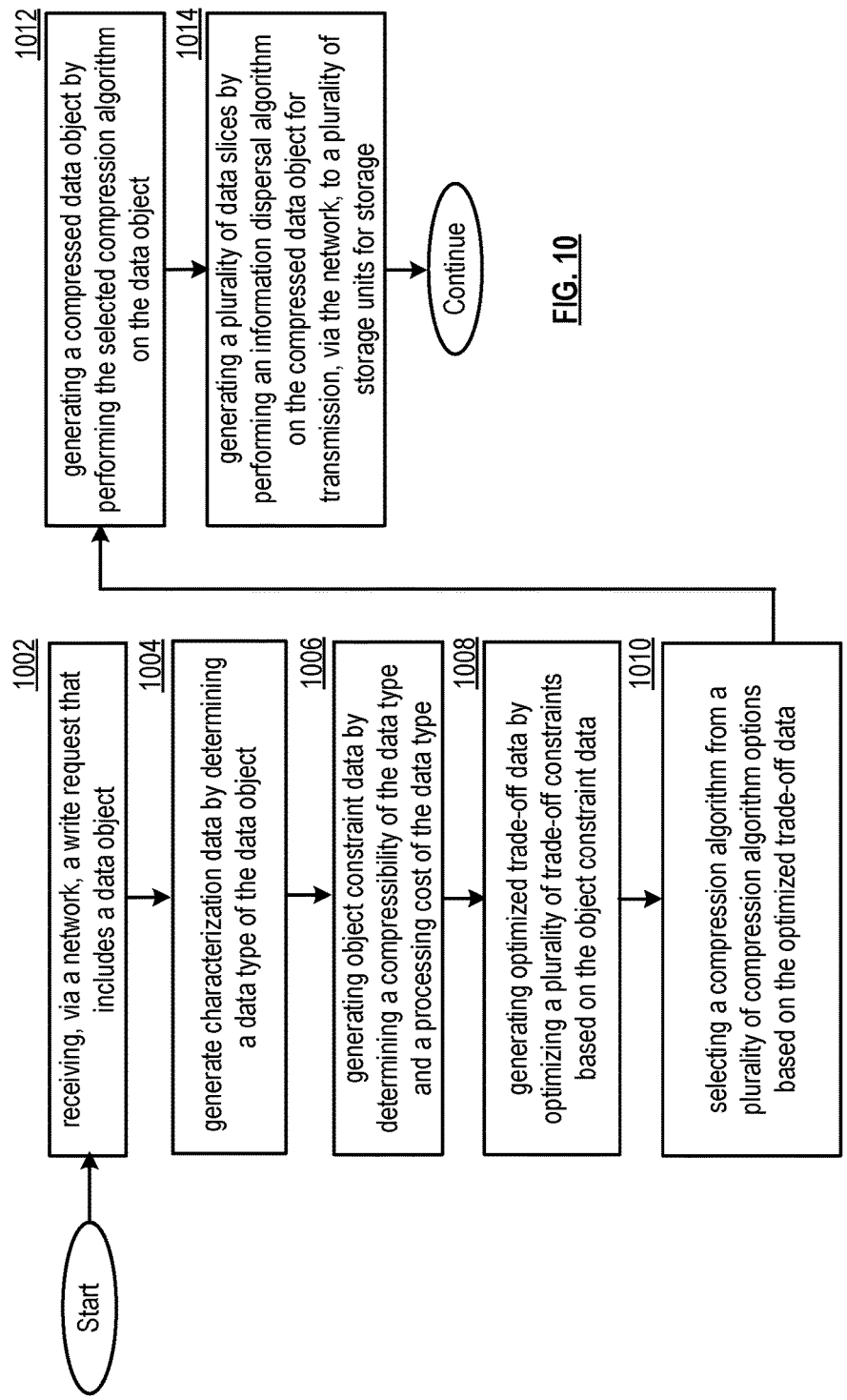
FIG. 10 is a logic diagram of an example of a method of compressing data objects in accordance with the present invention.

FIG. 10 is a flowchart illustrating an example of compressing a data object for storage. In particular, a method is presented for use in association with one or more functions and features described in conjunction with FIGS. 1-9, for execution by a dispersed storage and task (DST) processing unit that includes a processor or via another processing system of a dispersed storage network that includes at least one processor and memory that stores instruction that configure the processor or processors to perform the steps described below. Step 1002 includes receiving, via a network, a write request that includes a data object. Step 1004 includes generating characterization data by determining a data type of the data object. Step 1006 includes generating object constraint data by determining a compressibility of the data type and a processing cost of the data type. Step 1008 includes generating optimized trade-off data by optimizing a plurality of trade-off constraints based on the object constraint data. Step 1010 includes selecting a compression algorithm from a plurality of compression algorithm options based on the optimized trade-off data. Step 1012 includes generating a compressed data object by performing the selected compression algorithm on the data object. Step 1014 includes generating a plurality of data slices by performing an information dispersal algorithm on the compressed data object for transmission, via the network, to a plurality of storage units for storage.

In various embodiments, determining the data type of the data object is based on a mime type of the data object, a name of the data object, and/or an extension of the data object. In various embodiments, determining the data type of the data object is based on a heuristic analysis of content of the data object.

In various embodiments, generating the object constraint data includes performing a compression assessment using a live test, where the live test includes performing a plurality of different compression algorithms to generate a corresponding plurality of samples. The compressibility and the processing cost are determined based on the corresponding plurality of samples. In various embodiments, generating the object constraint data is based on historical results that include a plurality of previous samples for a plurality of data objects corresponding to the data type, where the plurality of previous samples were generated by performing a plurality of different compression algorithms on the plurality of data objects. The compressibility and the processing cost are determined based on the plurality of previous samples.

In various embodiments, compression decision data is generated to determine whether to compress the data object based on the object constraint data. The compression algorithm is selected when the compression decision data indicates that the data object be compressed. The plurality of data slices are generated by performing an information dispersal algorithm on the data object in an uncompressed format when the compression decision data indicates that the data object not be compressed.

In various embodiments, the plurality of trade-off constraints includes spare CPU resources of the DST processing unit, networking resources, storage capacity of the plurality of storage units, and/or compression rate of the compression algorithm. In various embodiments, generating the optimized trade-off data is further based on estimated access frequency of the data object and/or resources of entities expected to transmit read requests to read the data object. In various embodiments, generating the optimized trade-off data is further based on object access latency, where the object access latency is calculated based on networking bandwidth and/or processing time to decompress.

In various embodiments, the compressed data object includes algorithm indicator data. An access request is received via the network from a requesting entity, where the access request includes an identifier of the data object. A plurality of read requests are generated based on the identifier for transmission, via the network, to the plurality of storage units. The plurality of data slices are received via the network in response. A reconstructed compressed data object is generated based on the information dispersal algorithm. The algorithm indicator data is extracted from the reconstructed compressed data object. A decompression algorithm is selected from a plurality of decompression algorithm options based on the algorithm indicator data. A reconstructed data object is generated by performing the selected decompression algorithm. The reconstructed data object is transmitted to the requesting entity via the network.

In various embodiments, a non-transitory computer readable storage medium includes at least one memory section that stores operational instructions that, when executed by a processing system of a dispersed storage network (DSN) that includes a processor and a memory, causes the processing system to A method for execution by a dispersed storage and task (DST) processing unit includes receiving a write request that includes a data object. Characterization data is generated by determining a data type of the data object. Object constraint data is generated by determining a compressibility of the data type and a processing cost of the data type. Optimized trade-off data is generated by optimizing a plurality of trade-off constraints based on the object constraint data. A compression algorithm is selected from a plurality of compression algorithm options based on the optimized trade-off data. A compressed data object is generated by performing the selected compression algorithm on the data object. A plurality of data slices are generated for transmission to a plurality of storage units for storage by performing an information dispersal algorithm on the compressed data object.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit that includes a processor, the method comprises:
   receiving, via a network, a write request that includes a data object;
   generating characterization data by determining a data type of the data object;
   generating object constraint data by determining a compressibility of the data type and a processing cost of the data type;
   generating compression decision data to determine whether to compress the data object based on the object constraint data;
   when the compression decision data indicates that the data object be compressed:
      generating optimized trade-off data by optimizing a plurality of trade-off constraints based on the object constraint data;
      selecting a compression algorithm from a plurality of compression algorithm options based on the optimized trade-off data;
      generating a compressed data object by performing the selected compression algorithm on the data object; and
      generating a plurality of data slices by performing an information dispersal algorithm on the compressed data object for transmission, via the network, to a plurality of storage units for storage; and
   when the compression decision data indicates that the data object not be compressed:
      generating the plurality of data slices by performing the information dispersal algorithm on the data object in an uncompressed format for transmission, via the network, to the plurality of storage units for storage.

2. The method of claim 1, wherein determining the data type of the data object is based on at least one of: a mime type of the data object, a name of the data object, or an extension of the data object.

3. The method of claim 1, wherein determining the data type of the data object is based on a heuristic analysis of content of the data object.

4. The method of claim 1, wherein generating the object constraint data includes performing a compression assessment using a live test, wherein the live test includes performing a plurality of different compression algorithms to generate a corresponding plurality of samples, and wherein the compressibility and the processing cost are determined based on the corresponding plurality of samples.

5. The method of claim 1, wherein generating the object constraint data is based on historical results that include a plurality of previous samples for a plurality of data objects corresponding to the data type, wherein the plurality of previous samples were generated by performing a plurality of different compression algorithms on the plurality of data objects, and wherein the compressibility and the processing cost are determined based on the plurality of previous samples.

6. The method of claim 1, wherein the compression decision data indicates that the data object not be compressed in response to determining to minimize at least one of: a time to compress the data object for storage or a time to decompress the data object for retrieval.

7. The method of claim 1, wherein the plurality of trade-off constraints includes at least one of: spare CPU resources of the DST processing unit, networking resources, storage capacity of the plurality of storage units, or compression rate of the compression algorithm.

8. The method of claim 1, wherein generating the optimized trade-off data is further based on at least one of: estimated access frequency of the data object or resources of entities expected to transmit read requests to read the data object.

9. The method of claim 1, wherein generating the optimized trade-off data is further based on object access latency, wherein the object access latency is calculated based on at least one of: networking bandwidth or processing time to decompress.

10. The method of claim 1, wherein the compressed data object includes algorithm indicator data, further comprising:
receiving an access request, via the network, from a requesting entity, wherein the access request includes an identifier of the data object;
generating a plurality of read requests based on the identifier for transmission, via the network, to the plurality of storage units;
receiving, via the network, the plurality of data slices in response;
generating a reconstructed compressed data object based on the information dispersal algorithm;
extracting the algorithm indicator data from the reconstructed compressed data object;
selecting a decompression algorithm from a plurality of decompression algorithm options based on the algorithm indicator data;
generating a reconstructed data object by performing the selected decompression algorithm; and
transmitting the reconstructed data object, via the network, to the requesting entity.

11. A processing system of a dispersed storage and task (DST) processing unit comprises:
at least one processor;
a memory that stores operational instructions, that when executed by the at least one processor cause the processing system to:
receive, via a network, a write request that includes a data object;
generate characterization data by determining a data type of the data object;
generate object constraint data by determining a compressibility of the data type and a processing cost of the data type;
generating compression decision data to determine whether to compress the data object based on the object constraint data;
when the compression decision data indicates that the data object be compressed:
generate optimized trade-off data by optimizing a plurality of trade-off constraints based on the object constraint data;
select a compression algorithm from a plurality of compression algorithm options based on the optimized trade-off data;
generate a compressed data object by performing the selected compression algorithm on the data object; and
generate a plurality of data slices by performing an information dispersal algorithm on the compressed data object for transmission, via the network, to a plurality of storage units for storage; and
when the compression decision data indicates that the data object not be compressed:
generating the plurality of data slices by performing the information dispersal algorithm on the data object in an uncompressed format for transmission, via the network, to the plurality of storage units for storage.

12. The processing system of claim 11, wherein determining the data type of the data object is based on a heuristic analysis of content of the data object.

13. The processing system of claim 11, wherein generating the object constraint data includes performing a compression assessment using a live test, wherein the live test includes performing a plurality of different compression algorithms to generate a corresponding plurality of samples, and wherein the compressibility and the processing cost are determined based on the corresponding plurality of samples.

14. The processing system of claim 11, wherein generating the object constraint data is based on historical results that include a plurality of previous samples for a plurality of data objects corresponding to the data type, wherein the plurality of previous samples were generated by performing a plurality of different compression algorithms on the plurality of data objects, and wherein the compressibility and the processing cost are determined based on the plurality of previous samples.

15. The processing system of claim 11, wherein the compression decision data indicates that the data object not be compressed in response to determining to minimize at least one of: a time to compress the data object for storage or a time to decompress the data object for retrieval.

16. The processing system of claim 11, wherein the plurality of trade-off constraints includes at least one of: spare CPU resources of the DST processing unit, networking resources, storage capacity of the plurality of storage units, or compression rate of the compression algorithm.

17. The processing system of claim 11, wherein generating the optimized trade-off data is further based on at least one of: estimated access frequency of the data object or resources of entities expected to transmit read requests to read the data object.

18. The processing system of claim 11, wherein generating the optimized trade-off data is further based on object access latency, wherein the object access latency is calculated based on at least one of: networking bandwidth or processing time to decompress.

19. The processing system of claim 11, wherein the compressed data object includes algorithm indicator data, wherein the operational instructions, when executed by the at least one processor, further cause the processing system to:
receive an access request, via the network, from a requesting entity, wherein the access request includes an identifier of the data object;
generate a plurality of read requests based on the identifier for transmission, via the network, to the plurality of storage units;
receive, via the network, the plurality of data slices in response;
generate a reconstructed compressed data object based on the information dispersal algorithm;
extract the algorithm indicator data from the reconstructed compressed data object;
select a decompression algorithm from a plurality of decompression algorithm options based on the algorithm indicator data;
generate a reconstructed data object by performing the selected decompression algorithm; and
transmit the reconstructed data object, via the network, to the requesting entity.

20. A non-transitory computer readable storage medium comprises:
at least one memory section that stores operational instructions that, when executed by a processing system of a dispersed storage network (DSN) that includes a processor and a memory, causes the processing system to:
receive, via a network, a write request that includes a data object;
generate characterization data by determining a data type of the data object;
generate object constraint data by determining a compressibility of the data type and a processing cost of the data type;
generating compression decision data to determine whether to compress the data object based on the object constraint data;
when the compression decision data indicates that the data object be compressed:
generate optimized trade-off data by optimizing a plurality of trade-off constraints based on the object constraint data;
select a compression algorithm from a plurality of compression algorithm options based on the optimized trade-off data;
generate a compressed data object by performing the selected compression algorithm on the data object; and
generate a plurality of data slices by performing an information dispersal algorithm on the compressed data object for transmission, via the network, to a plurality of storage units for storage; and
when the compression decision data indicates that the data object not be compressed:
generating the plurality of data slices by performing the information dispersal algorithm on the data object in an uncompressed format for transmission, via the network, to the plurality of storage units for storage.

* * * * *